(12) United States Patent
Yang (10) Patent No.: US 11,627,170 B2
(45) Date of Patent: Apr. 11, 2023

(54) ENHANCEMENTS FOR REAL-TIME TEXT (RTT) CALL CONTROL OVER AN IP MULTIMEDIA SUBSYSTEM (IMS) NETWORK

(71) Applicant: MEDIATEK INC., Hsinchu (TW)

(72) Inventor: Shu-Lin Yang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 28 days.

(21) Appl. No.: 17/368,971

(22) Filed: Jul. 7, 2021

(65) Prior Publication Data

US 2022/0014569 A1   Jan. 13, 2022

Related U.S. Application Data

(60) Provisional application No. 63/049,714, filed on Jul. 9, 2020.

(51) Int. Cl.
| | |
|---|---|
| *H04L 65/1096* | (2022.01) |
| *H04W 4/16* | (2009.01) |
| *H04L 65/1069* | (2022.01) |
| *H04L 65/1104* | (2022.01) |

(52) U.S. Cl.
CPC ...... *H04L 65/1096* (2013.01); *H04L 65/1069* (2013.01); *H04L 65/1104* (2022.05); *H04W 4/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0093542 | A1* | 4/2011 | Lau | H04L 65/1083 709/224 |
| 2011/0206040 | A1* | 8/2011 | Potts | H04L 65/1104 370/352 |
| 2016/0380931 | A1* | 12/2016 | Sircar | H04L 51/063 709/206 |

* cited by examiner

*Primary Examiner* — Amal S Zenati
(74) *Attorney, Agent, or Firm* — McClure, Qualey & Rodack, LLP (57) ABSTRACT

A first UE receives a first Session Initiation Protocol (SIP) INVITE message requesting the first UE to place the RTT call on hold, during an ongoing Real-Time Text (RTT) call with a second UE. In response to the first SIP INVITE message, the first UE sends a first SIP 200 OK message to the second UE, and the first SIP 200 OK message indicates that the first UE is not allowed to send and receive media data. After sending the first SIP 200 OK message, the first UE receives a second SIP INVITE message requesting the first UE to resume the RTT call. In response to the second SIP INVITE message, the first UE sends a third SIP INVITE message to the second UE, and the third SIP INVITE message indicates that the first UE is allowed to send and receive media data.

16 Claims, 5 Drawing Sheets

ENHANCEMENTS FOR REAL-TIME TEXT (RTT) CALL CONTROL OVER AN IP MULTIMEDIA SUBSYSTEM (IMS) NETWORK

CROSS REFERENCE TO RELATED APPLICATIONS

This application claims priority under 35 U.S.C. § 119 from U.S. Provisional Application No. 63/049,714, entitled "Silent unhold for RTT", filed on Jul. 9, 2020, the subject matter of which is incorporated herein by reference.

BACKGROUND OF THE APPLICATION

Field of the Application

The application generally relates to call services, and more particularly, to enhancements for Real-Time Text (RTT) call control over an IP Multimedia Subsystem (IMS) network.

Description of the Related Art

In a typical mobile communication environment, a User Equipment (UE)(also called a Mobile Station (MS)), such as a mobile telephone (also known as a cellular or cell phone), or a tablet Personal Computer (PC) with wireless communication capability may communicate voice and/or data signals with one or more cellular networks. The wireless communication between the UE and the cellular networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In a 4G/5G network, an IP Multimedia Subsystem (IMS) network may be deployed to provide a reliable way of establishing a signaling plane between two or more UEs. For example, call services, including voice calls and Real-Time Text (RTT) calls, data can be transmitted over this signaling plane to provide reliability and dedicated Quality of Service (QoS). RTT allows for a near instantaneous transmission of text content between IP-based terminals. As a user of a source UE types a message during an RTT call with another user of a destination UE, the text content of the message is (without providing a "send" button for the user to select) transmitted to, and displayed on, the destination UE in real-time. The transmission of text content can occur character-by-character such that the user of the destination UE may see each character appear on the display of the destination UE in real-time, as the characters are typed by the user of the source UE. This near instantaneous transmission of text content resembles a more natural conversation that is preferred by the hearing and speech impaired users over traditional text messaging (e.g., Short Message Service (SMS) text).

Figure 1:
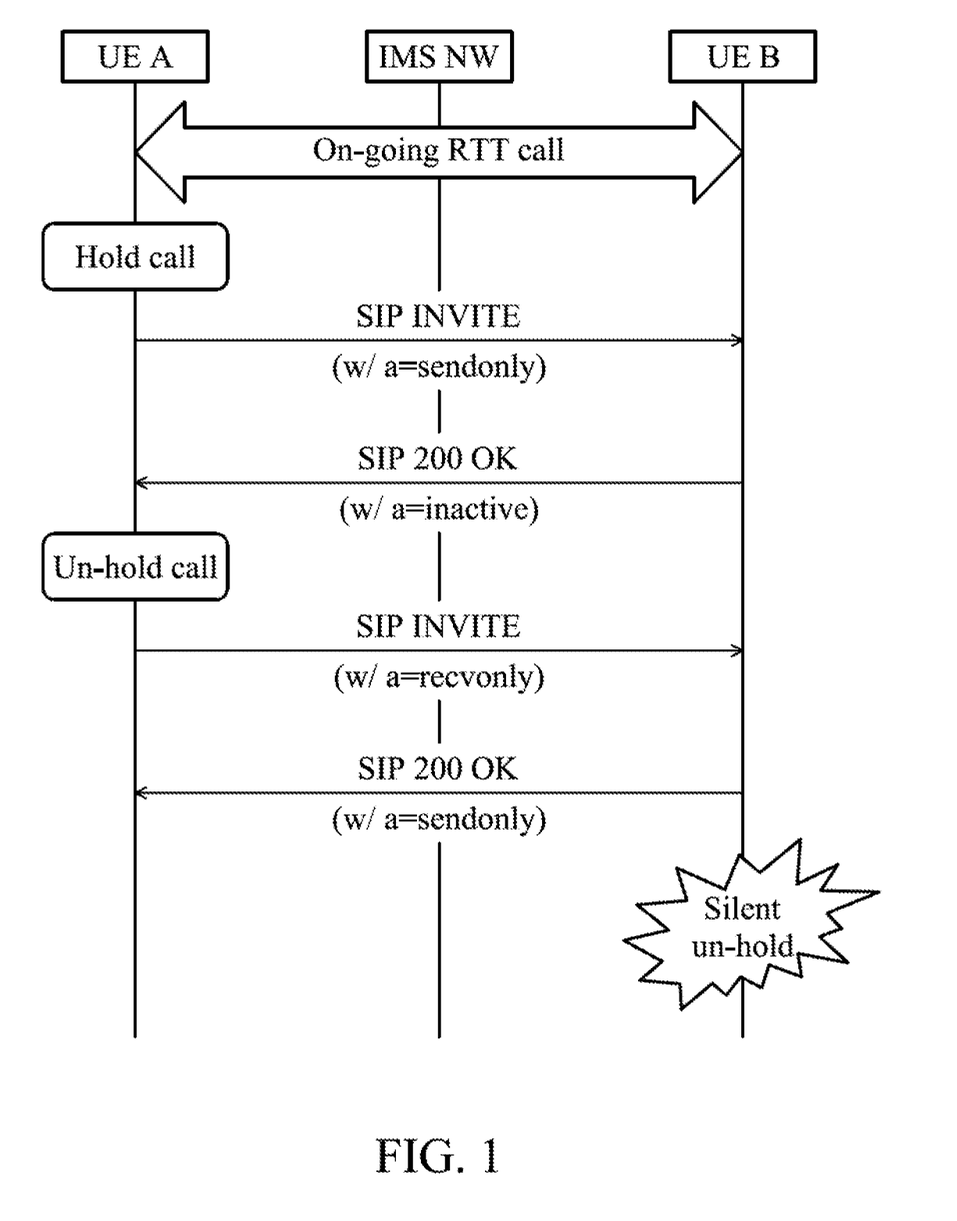
FIG. 1 is a schematic diagram illustrating the silent un-hold phenomenon.

However, it is observed that after an RTT call conducted over an IMS network is put on hold at the request of one party (e.g., the source UE), the SIP signaling specified by some network operator (e.g., Verizon) for resuming the on-hold call may render the other party (e.g., the destination UE) to enter a communication mode in which it can only send media data to the source UE rather than receive media data (e.g., RTT messages) from the source UE. This situation can also be referred to as a silent un-hold phenomenon. FIG. 1 is a schematic diagram illustrating the silent un-hold phenomenon.

A solution is sought.

BRIEF SUMMARY OF THE APPLICATION

The present application proposes to eliminate the silent un-hold phenomenon by allowing the destination UE to send a Re-INVITE message (i.e., a SIP INVITE message sent during an existing/ongoing call session) to reset the communication mode to both transmission and reception allowed in both call parties.

In one aspect of the application, a first UE comprising a wireless transceiver and a controller is provided. The wireless transceiver is configured to perform wireless transmission and reception to and from a mobile communication network. The controller is coupled to the wireless transceiver, and configured to perform the following via the wireless transceiver: during an ongoing Real-Time Text (RTT) call with a second UE, receiving a first Session Initiation Protocol (SIP) INVITE message requesting the first UE to place the RTT call on hold; in response to the first SIP INVITE message, sending a first SIP 200 OK message to the second UE, wherein the first SIP 200 OK message indicates that the first UE is not allowed to send and receive media data; after sending the first SIP 200 OK message, receiving a second SIP INVITE message requesting the first UE to resume the RTT call; and in response to the second SIP INVITE message, sending a third SIP INVITE message to the second UE, wherein the third SIP INVITE message indicates that the first UE is allowed to send and receive media data.

In another aspect of the application, a method executed by a first UE is provided. The method comprises the following steps: during an ongoing RTT call with a second UE, receiving a first SIP INVITE message requesting the first UE to place the RTT call on hold; in response to the first SIP INVITE message, sending a first SIP 200 OK message to the second UE, wherein the first SIP 200 OK message indicates that the first UE is not allowed to send and receive media data; after sending the first SIP 200 OK message, receiving a second SIP INVITE message requesting the first UE to resume the RTT call; and in response to the second SIP INVITE message, sending a third SIP INVITE message to the second UE, wherein the third SIP INVITE message indicates that the first UE is allowed to send and receive media data.

In one example, the first SIP INVITE message comprises a Session Description Protocol (SDP) attribute "a=sendonly" indicating that the second UE is allowed to only send media data to the first UE (rather than receive media data from the first UE).

In one example, the second SIP INVITE message comprises an SDP attribute "a=recvonly" indicating that the second UE is allowed to only receive media data from the first UE (rather than send media data to the first UE).

In one example, the first UE sends a second SIP 200 OK message to the second UE in response to the second SIP INVITE message, wherein the second SIP 200 OK message indicates that the first UE is allowed to only send media data to the second UE (rather than receive media data from the second UE). The second SIP 200 OK message comprises an SDP attribute "a=sendonly" indicating that the first UE is allowed to only send media data to the second UE (rather than receive media data from the second UE).

In one example, the first UE further receives a third SIP 200 OK message comprising an SDP attribute "a=sendrecv" from the second UE, and resumes the RTT call in response to receiving the third SIP 200 OK message.

In one example, the first SIP 200 OK message comprises an SDP attribute "a=inactive" indicating that the first UE is not allowed to send and receive media data to and from the second UE.

In one example, the third SIP INVITE message comprises an SDP attribute "sendrecv" indicating that the first UE is allowed to send and receive media data to and from the second UE.

Other aspects and features of the present application will become apparent to those with ordinary skill in the art upon review of the following descriptions of specific embodiments of the apparatuses and methods for enhancing RTT call control over an IMS network.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 2:
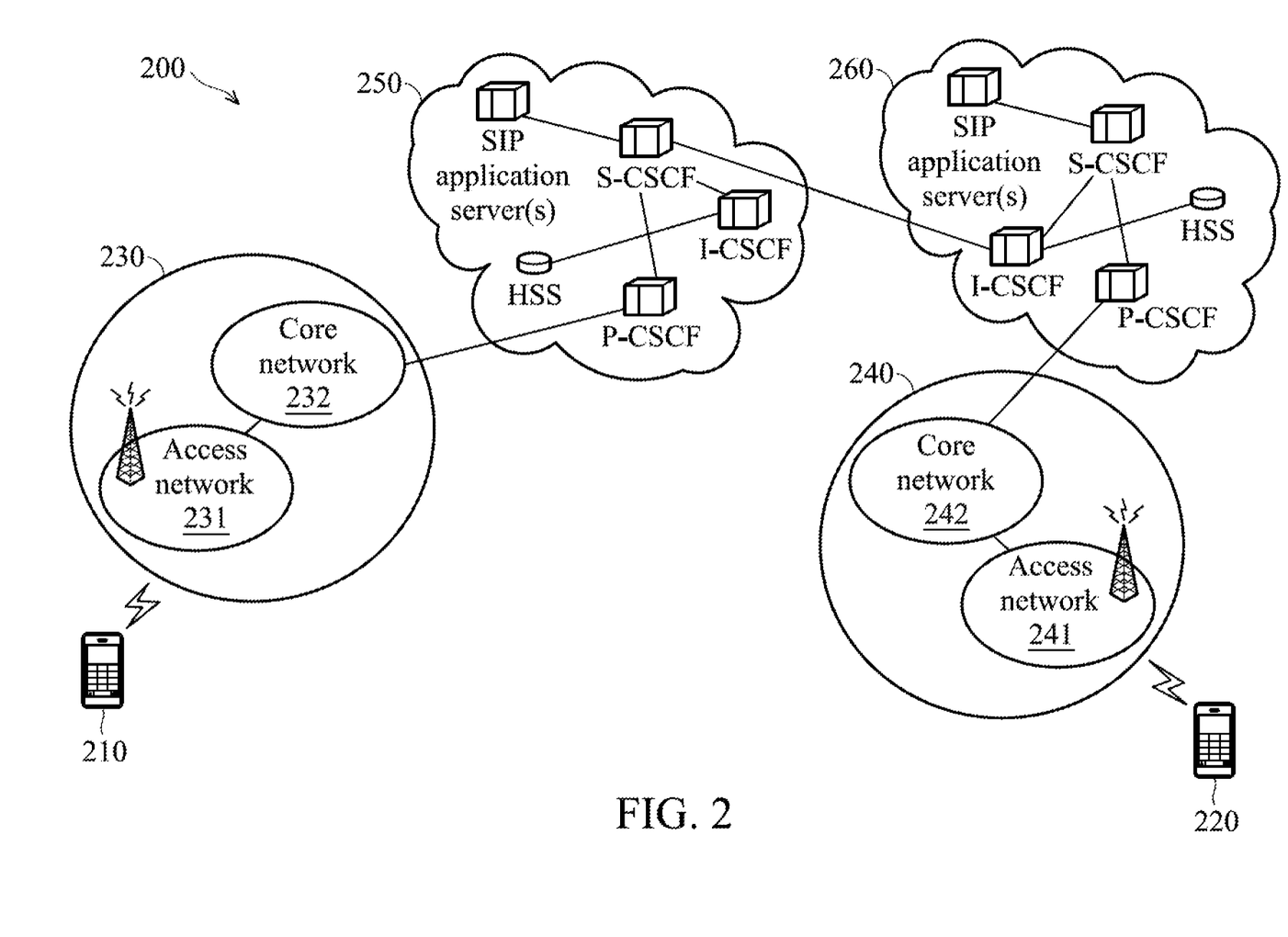
FIG. 2 is a block diagram of an IMS architecture according to an embodiment of the application.

FIG. 2 is a block diagram of an IMS architecture according to an embodiment of the application.

As shown in FIG. 2, the IMS architecture 200 includes two User Equipment (UEs) 210~220, two mobile communication networks 230~240, and two IMS networks 250~260. In one example, the IMS network 250 is deployed by the operator of the mobile communication network 230, while the IMS network 260 is deployed by the operator of the mobile communication network 240; and the operator of the mobile communication network 230 may be different from the operator of the mobile communication network 240.

Each of the UEs 210~220 may be a mobile phone (e.g., feature phone or smartphone), a panel Personal Computer (PC), a laptop computer, a desktop computer, or any device with a Real-Time Text (RTT) call processing functionality. For example, the UE 210 may be a mobile phone which can connect to the IMS network 250 via the mobile communication network 230, and make an RTT call to the UE 220; while the UE 220 may be a mobile phone which can connect to the IMS network 260 via the mobile communication network 240, and make an RTT call to the UE 210.

The mobile communication network 230 may be a cellular network including an access network 231 and a core network 232, while the mobile communication network 240 may be a cellular network including an access network 241 and a core network 242. Each of the access networks 231 and 241 is responsible for processing radio signals, terminating radio protocols, and connecting the UE 210/220 with the core network 232/242, while each of the core networks 232 and 242 is responsible for performing mobility management, network-side authentication, and interfaces with public/external networks (e.g., the IMS network 250/260 and/or the Internet).

In one embodiment, if the mobile communication network 230/240 is a 4G network (e.g., an LTE/LTE-A/TD-LTE network), the access network 231/241 may be an Evolved-Universal Terrestrial Radio Access Network (E-UTRAN) and the core network 232/242 may be an Evolved Packet Core (EPC). The E-UTRAN may include at least an evolved NodeB (eNB) (e.g., a macro eNB, femto eNB, or pico eNB). The EPC may include a Home Subscriber Server (HSS), Mobility Management Entity (MME), Serving Gateway (S-GW), and Packet Data Network Gateway (PDN-GW or P-GW).

In one embodiment, if the mobile communication network 230/240 is a 5G network (e.g., an NR network), the access network 231/241 may be a Next Generation Radio Access Network (NG-RAN) and the core network 232/242 may be a Next Generation Core Network (NG-CN). The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

Each of the IMS networks 250~260 is a call service system consisting of various network functions for providing Internet Protocol (IP) multimedia services to the UEs 210~220 over the mobile communication networks 230~240. For example, each of the IMS networks 250~260 may include an IMS core which at least includes a Home Subscriber Server (HSS), a Call Session Control Function (CSCF), a Signaling Gateway (SGW), a Media Gateway Control Function (MGCF), and a Media Resource Function (MRF), wherein each network function may be implemented as a network element on dedicated hardware (e.g., a computing device, a server, or a processing circuit of a processor in a computing device or server), or as a software instance running on dedicated hardware, or as a virtualized function instantiated on an appropriate platform, e.g., a cloud infrastructure. The HSS generally refers to the master database that maintains all user profile information used to authenticate and authorize subscribers. The CSCF is the heart of the IMS architecture, which is responsible for controlling sessions between endpoints (referred to as terminals in the IMS specifications) and applications. The CSCF function is distributed across three types of functional elements, including Proxy CSCF (P-CSCF), Interrogating CSCF (I-CSCF), and Serving CSCF (S-CSCF), based on the specialized function they perform. The SGW and the MGCF are responsible for providing interoperability with the Public Switched Telephone Network (PSTN). The MRF provides media-related functions such as the playing of tones and digital announcements.

The IP multimedia services provided by the IMS networks 250~260 at least includes call services, such as Voice over LTE (VoLTE), Video over LTE (ViLTE), Voice over NR (VoNR), Video over NR (ViNR), RTT, etc. In addition, the IP multimedia services may also include data services, such as Short Message Service (SMS) over IMS, Mission Critical Push To Talk (MCPTT), Mission Critical Video (MCVideo), Mission Critical Data (MCData), Rich Communication Services (RCS), XML Configuration Access Protocol (XCAP), and others.

In accordance with one novel aspect, enhanced controls over an RTT call are introduced in the UE side. Specifically, during an RTT call, a UE receiving the on-hold request (i.e., a SIP INVITE message requesting the UE to place the RTT call on hold) may check if a response to the on-hold request should include a Session Description Protocol (SDP) attribute "a=inactive" (which indicates that the UE is not allowed to send and receive media data) according to the SIP signaling rules specified by the operator of the mobile communication network that the UE is connected to. If so, the UE may proceed as specified by the SIP signaling rules, and when the silent un-hold phenomenon occurs later, send a SIP INVITE message to reset the communication mode to both transmission and reception allowed in both call parties.

Figure 3:
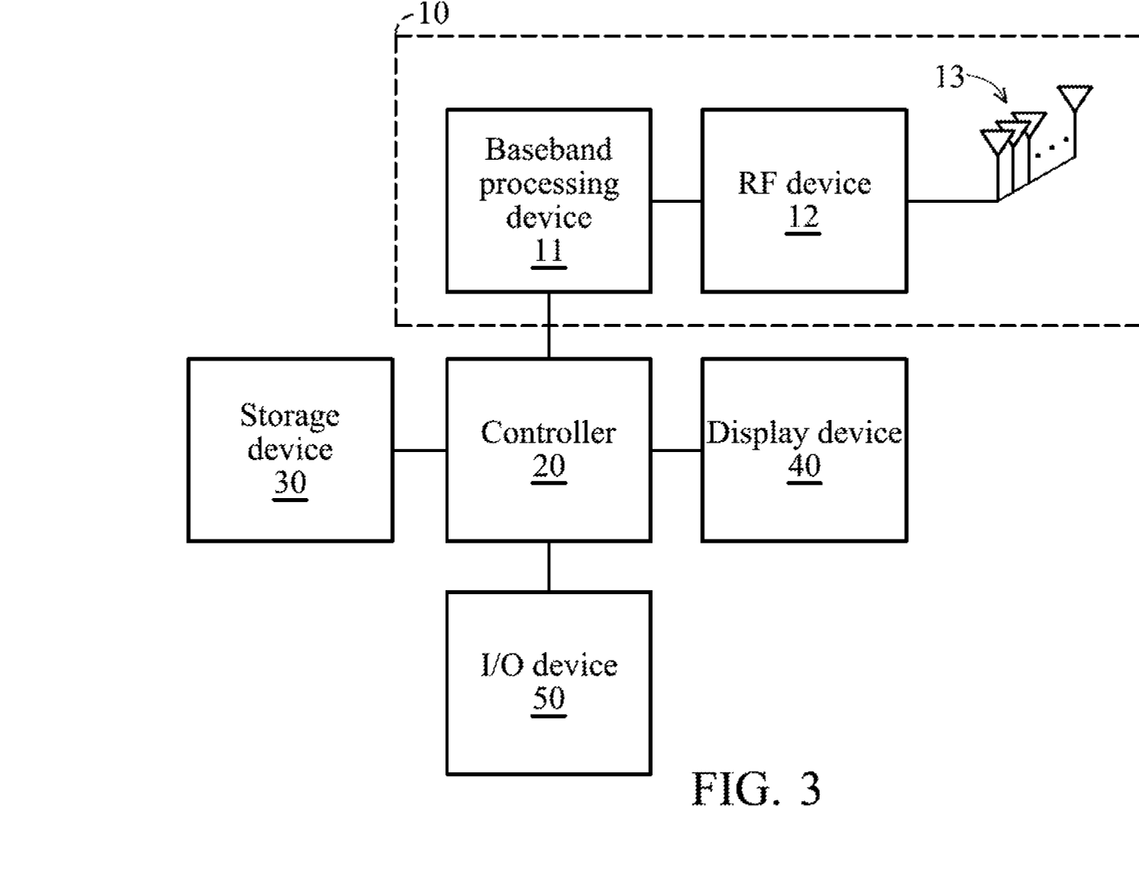
FIG. 3 is a block diagram illustrating a UE according to an embodiment of the application.

FIG. 3 is a block diagram illustrating a UE according to an embodiment of the application.

As shown in FIG. 3, a UE (e.g., source UE or destination UE) may include a wireless transceiver 10, a controller 20, a storage device 30, a display device 40, and an Input/Output (I/O) device 50.

The wireless transceiver 10 is configured to perform wireless transmission and reception to and from other the mobile communication network 230/240.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the service network 120, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application. For example, the communication protocols may include a SIP signaling protocol, and a 4G LTE or 5G NR protocol stack which includes a Non-Access-Stratum (NAS) layer to communicate with an AMF/SMF/MME entity connecting to the core network 232/242, a Radio Resource Control (RRC) layer for high layer configuration and control, a Packet Data Convergence Protocol/Radio Link Control (PDCP/RLC) layer, a Media Access Control (MAC) layer, and a Physical (PHY) layer.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application. For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 4:
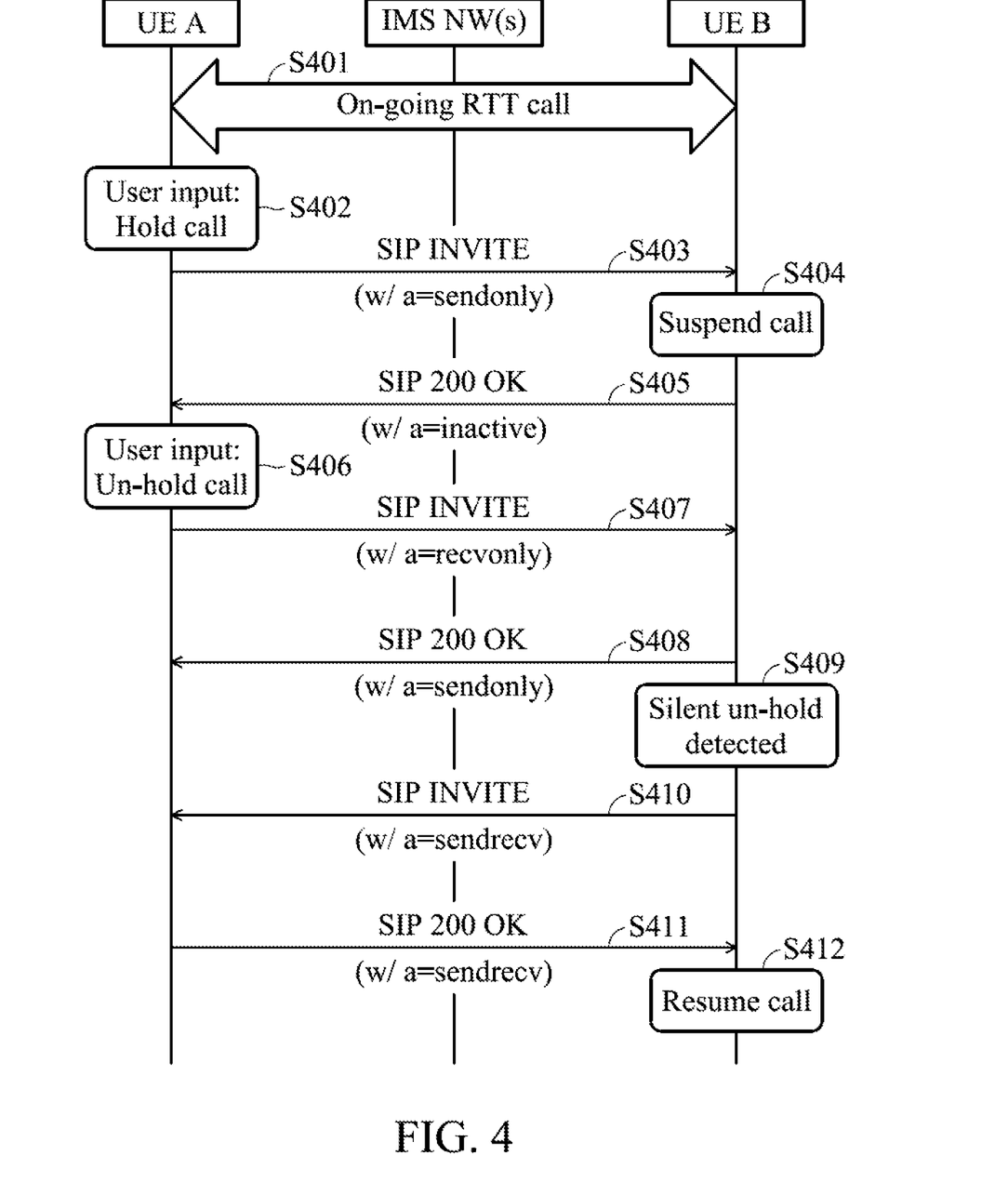
FIG. 4 is a message sequence chart illustrating the enhanced controls over an RTT call to eliminate the silent un-hold phenomenon according to an embodiment of the application.

FIG. 4 is a message sequence chart illustrating the enhanced controls over an RTT call to eliminate the silent un-hold phenomenon according to an embodiment of the application.

In step S401, UE A and UE B establish an RTT call session.

In step S402, UE A receives a user input indicating to hold the ongoing RTT call.

In step S403, UE A sends a SIP INVITE message to UE B to request UE B to place the RTT call on hold. Specifically, the SIP INVITE message includes an SDP attribute "a=sendonly" which indicates that UE A is allowed to only send media data to UE B (rather than receive media data from UE B).

In step S404, UE B suspends the RTT call in response to the received SIP INVITE message.

In step S405, UE B sends a SIP 200 OK message including an SDP attribute "a=inactive" to the second UE, wherein the SDP attribute "a=inactive" indicates that UE B is not allowed to send and receive media data to and from UE A. Specifically, the SDP attribute in the SIP 200 OK message is set according to the SIP signaling rules specified by the operator of the mobile communication device that UE B is connected to.

In step S406, UE A receives a user input indicating to un-hold the RTT call.

In step S407, UE A sends a SIP INVITE message to UE B to request UE B to resume the RTT call. Specifically, the SIP INVITE message includes an SDP attribute "a=recvonly" which indicates that UE A is allowed to only receive media data from UE B (rather than send media data to UE B).

In step S408, UE B sends a SIP 200 OK message including an SDP attribute "a=inactive" to UE A, wherein the SDP attribute "a=sendonly" indicates that UE B is allowed to only send media data to UE A (rather than receive media data from UE A). Specifically, the SDP attribute in the SIP 200 OK message is set according to the SIP signaling rules specified by the operator of the mobile communication device that UE B is connected to.

In step S409, UE B enters a communication mode in which it can only send media data (e.g., RTT messages) to UE A (rather than receive media data from UE A), i.e., the silent un-hold phenomenon is detected.

In step S410, UE B sends a SIP INVITE message to UE A to reset the communication mode to both transmission and reception allowed in both call parties. Specifically, the SIP INVITE message includes an SDP attribute "a=sendrecv" which indicates that UE B is allowed to send and receive media data to and from UE A.

In step S411, UE A sends a SIP 200 OK message including an SDP attribute "a=sendrecv" to UE B, wherein the SDP attribute "a=sendrecv" indicates that UE A is allowed to send and receive media data to and from UE B.

In step S412, UE B resumes the RTT call in response to the received SIP 200 OK message.

Figure 5:
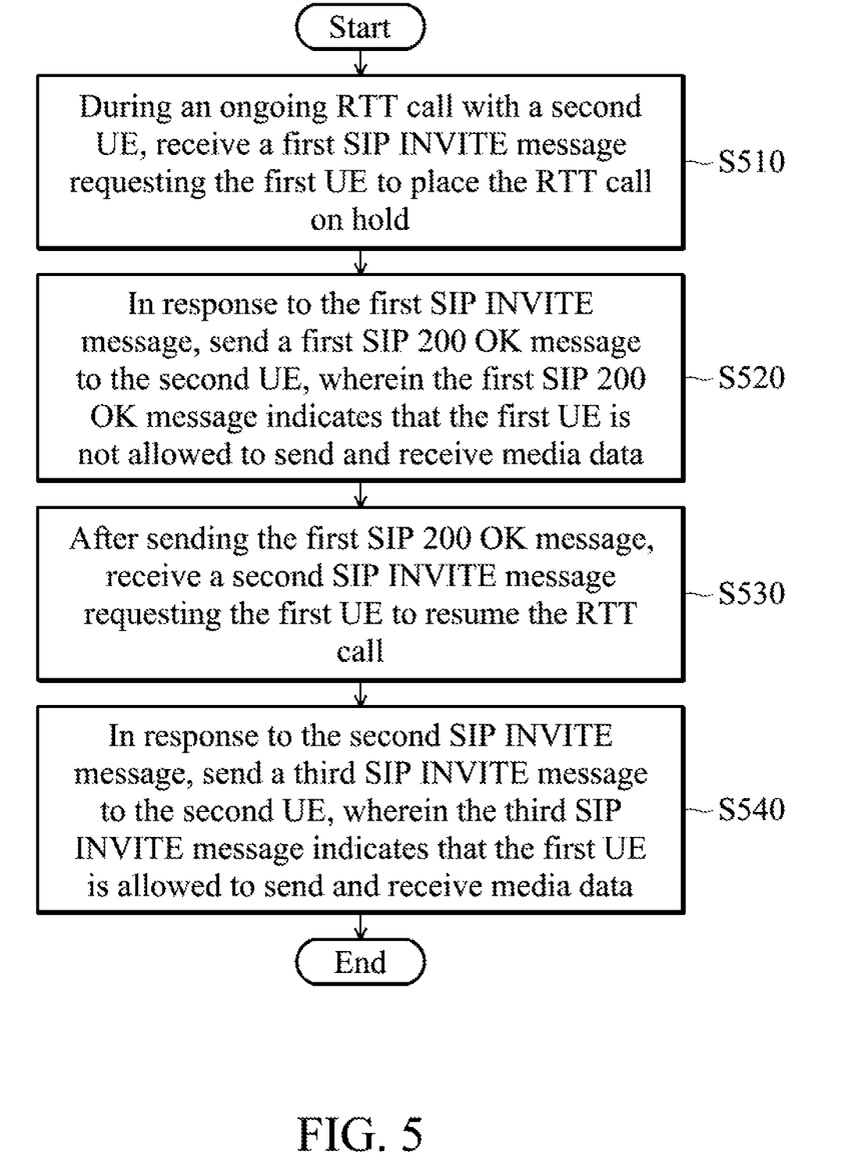
FIG. 5 is a flow chart illustrating the method for enhancing RTT call control over an IMS network according to an embodiment of the application.

FIG. 5 is a flow chart illustrating the method for enhancing RTT call control over an IMS network according to an embodiment of the application.

In this embodiment, the method for enhancing RTT call control over an IMS network is applied to and executed by a first UE (e.g., the UE 210).

In step S510, during an ongoing RTT call with a second UE (e.g., the UE 220), the first UE receives a first SIP INVITE message requesting the first UE to place the RTT call on hold.

In one example, the first SIP INVITE message includes an SDP attribute "a=sendonly" indicating that the second UE is allowed to only send media data to the first UE (rather than receive media data from the first UE).

In step S520, the first UE sends a first SIP 200 OK message to the second UE in response to the first SIP INVITE message, wherein the first SIP 200 OK message indicates that the first UE is not allowed to send and receive media data.

In one example, the first SIP 200 OK message includes an SDP attribute "a=inactive" to indicate that the first UE is not allowed to send and receive media data to and from the second UE.

In step S530, the first UE receives a second SIP INVITE message requesting the first UE to resume the RTT call, after sending the first SIP 200 OK message.

In one example, the second SIP INVITE message includes an SDP attribute "a=recvonly" indicating that the second UE is allowed to only receive media data from the first UE (rather than send media data to the first UE).

In step S540, the first UE sends a third SIP INVITE message to the second UE in response to the second SIP INVITE message, wherein the third SIP INVITE message indicates that the first UE is allowed to send and receive media data.

In one example, the third SIP INVITE message includes an SDP attribute "sendrecv" to indicate that the first UE is allowed to send and receive media data to and from the second UE.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A first User Equipment (UE), comprising:
   a wireless transceiver, configured to perform wireless transmission and reception to and from a mobile communication network; and
   a controller, coupled to the wireless transceiver, and configured to perform the following via the wireless transceiver:
   during an ongoing Real-Time Text (RTT) call with a second UE, receiving a first Session Initiation Protocol (SIP) INVITE message requesting the first UE to place the RTT call on hold;
   in response to the first SIP INVITE message, sending a first SIP 200 OK message to the second UE, wherein the first SIP 200 OK message indicates that the first UE is not allowed to send and receive media data;
   after sending the first SIP 200 OK message, receiving a second SIP INVITE message requesting the first UE to resume the RTT call; and
   in response to the second SIP INVITE message, sending a third SIP INVITE message to the second UE, wherein the third SIP INVITE message indicates that the first UE is allowed to send and receive media data.

2. The first UE as claimed in claim 1, wherein the first SIP INVITE message comprises a Session Description Protocol (SDP) attribute "a=sendonly" indicating that the second UE is allowed to only send media data to the first UE.

3. The first UE as claimed in claim 1, wherein the second SIP INVITE message comprises an SDP attribute "a=recvonly" indicating that the second UE is allowed to only receive media data from the first UE.

4. The first UE as claimed in claim 1, wherein the controller is further configured to send a second SIP 200 OK message to the second UE in response to the second SIP INVITE message, and the second SIP 200 OK message indicates that the first UE is allowed to only send media data to the second UE.

5. The first UE as claimed in claim 4, wherein the second SIP 200 OK message comprises an SDP attribute "a=sendonly" indicating that the first UE is allowed to only send media data to the second UE.

6. The first UE as claimed in claim 1, wherein the controller is further configured to receive a third SIP 200 OK message comprising an SDP attribute "a=sendrecv" from the second UE, and resume the RTT call in response to receiving the third SIP 200 OK message.

7. The first UE as claimed in claim 1, wherein the first SIP 200 OK message comprises an SDP attribute "a=inactive" indicating that the first UE is not allowed to send and receive media data to and from the second UE.

8. The first UE as claimed in claim 1, wherein the third SIP INVITE message comprises an SDP attribute "sendrecv" indicating that the first UE is allowed to send and receive media data to and from the second UE.

9. A method, executed by a first User Equipment (UE), the method comprising:
   during an ongoing Real-Time Text (RTT) call with a second UE, receiving a first Session Initiation Protocol (SIP) INVITE message requesting the first UE to place the RTT call on hold;
   in response to the first SIP INVITE message, sending a first SIP 200 OK message to the second UE, wherein the first SIP 200 OK message indicates that the first UE is not allowed to send and receive media data;
   after sending the first SIP 200 OK message, receiving a second SIP INVITE message requesting the first UE to resume the RTT call; and
   in response to the second SIP INVITE message, sending a third SIP INVITE message to the second UE, wherein the third SIP INVITE message indicates that the first UE is allowed to send and receive media data.

10. The method as claimed in claim 9, wherein the first SIP INVITE message comprises a Session Description Protocol (SDP) attribute "a=sendonly" indicating that the second UE is allowed to only send media data to the first UE.

11. The method as claimed in claim 9, wherein the second SIP INVITE message comprises an SDP attribute "a=recvonly" indicating that the second UE is allowed to only receive media data from the first UE.

12. The method as claimed in claim 9, further comprising:
    in response to the second SIP INVITE message, sending a second SIP 200 OK message to the second UE, wherein the second SIP 200 OK message indicates that the first UE is allowed to only send media data to the second UE.

13. The method as claimed in claim 12, wherein the second SIP 200 OK message comprises an SDP attribute "a=sendonly" indicating that the first UE is allowed to only send media data to the second UE.

14. The method as claimed in claim 9, further comprising:
    receiving a third SIP 200 OK message comprising an SDP attribute "a=sendrecv" from the second UE; and
    resuming the RTT call in response to receiving the third SIP 200 OK message.

15. The method as claimed in claim 9, wherein the first SIP 200 OK message comprises an SDP attribute "a=inactive" indicating that the first UE is not allowed to send and receive media data to and from the second UE.

16. The method as claimed in claim 9, wherein the third SIP INVITE message comprises an SDP attribute "sendrecv" indicating that the first UE is allowed to send and receive media data to and from the second UE.

* * * * *